Feb. 22, 1938.                J. BLACKBURN                2,108,957
                          FRICTIONAL WIRE CONNECTER
                             Filed Feb. 26, 1934

INVENTOR
JASPER BLACKBURN
By Adam E. Fisher
ATTORNEY

Patented Feb. 22, 1938

2,108,957

UNITED STATES PATENT OFFICE 2,108,957

FRICTIONAL WIRE CONNECTER

Jasper Blackburn, Webster Groves, Mo.

Application February 26, 1934, Serial No. 712,925

9 Claims. (Cl. 173—263)

This invention relates to frictional wire connecters for electrically joining lead-in wires, service wires or tap-lines to the main electrical supply lines, as usually employed in the installation of telephone, telegraph and electric light systems. The invention here provided more particularly relates to that class of such connecters employing a keeper lug or bolt-like member having legs spaced apart for providing a wire receiving space therein between, the outer sides thereof being complementally rounded and segmentally screw threaded for engaging a tapped nut for forcing the entered wires to their seat at the closed end of the keeper lug, the nut itself being freely and operatively anchored, thru one expedient or another, to one of the legs of the keeper lug or bolt, to the end that the assembly may constitute a unitary structure eliminating the chance of loss of either of the elements. Heretofore in such connecters the legs of the keeper lug or bolt member have been rigidly connected to a common head portion in a permanent, rigid, immovable alignment. However it is found that the entrance of the wires into the space between the legs of the keeper lug may be considerably facilitated by the simple expedient of freely joining the legs at their common head portion, so that one of the legs may be swung aside for passing the wires therein between, the nut and associated washer or bearing element being freely and operatively anchored to the other leg. The provision of such a structure accordingly constitutes the prime purpose of the present invention.

Another object is to provide in a unitary connecter of the kind referred to, a keeper element comprising two legs movably connected and spaced apart at one portion for admitting and confining wires therein between at that portion, with means operatively anchored to one of the legs for releasably locking the legs upon the wires.

Another object is to provide a conecter including a somewhat elongated keeper element having two legs movably joined and spaced apart at transversely adjacent portions when moved into a substantially parallel relation, for providing a wire receiving opening therein between, the outer sides of the legs being rounded and complementally screw threaded to engage a tapped nut, a tapped nut adapted to engage the said threaded legs, and means for operatively anchoring the nut to one of the legs in such a way that the nut may be withdrawn to the end thereof so as to leave the other leg free to move relatively thereto for the admission or removal of wires.

Another object is to provide a wire connecter comprising two elongated legs freely connected adjacent one end, their outer sides being complementally rounded and segmentally screw threaded for engaging a tapped nut when the legs are aligned for the purpose, there being a wire receiving space provided between the legs as so aligned, a bearing element slidably associated with the legs the same being loosely anchored upon one of the legs and withdrawable to the end thereof for freeing the other leg for opening a wire into the said wire receiving space, and a nut rotatably anchored to the outer face of the said bearing element and adapted to threadably engage the said aligned legs of the connecter for locking the wires therein between.

With the foregoing and such additional objects and advantages in view as will be pointed out in the following specification and claims, attention is now directed to the accompanying drawing as setting forth certain embodiments of the invention, the same constituting a part of the specification, and wherein:

Figure 1:
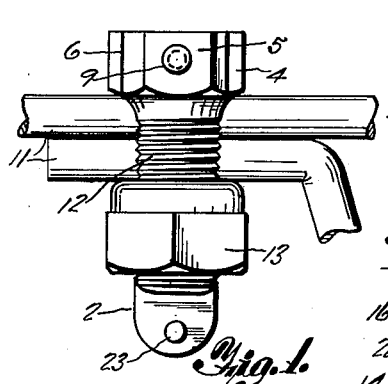
Figure 1 is a side elevation of one embodiment of the invention, two wires being shown as joined thereby.
Figure 2:
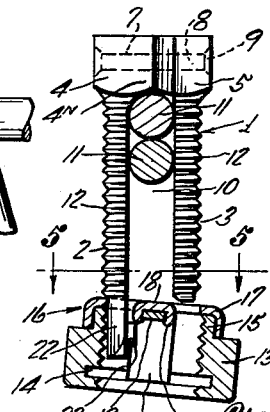
Figure 2 is a side elevation of the connecter alone of Figure 1, taken at ninety degrees to the view of Figure 1, the nut and associated bearing element being in section and shown as fully withdrawn to the end of the leg upon which they are anchored for the freeing of the opposite leg for pivotal movement, the inserted wires being shown in section.
Figure 3:
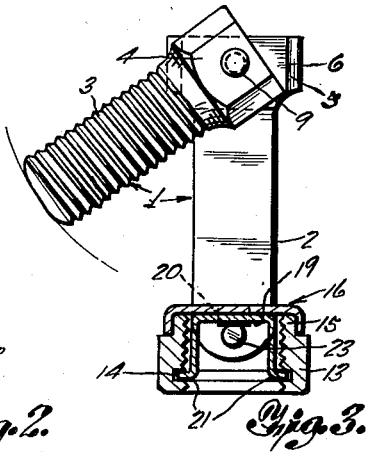
Figure 3 is a side elevation of the assembly of Figure 2 taken at ninety degrees thereto, the pivot leg being shown as swung aside free of the nut and bearing element, the latter being shown in section.
Figure 4:
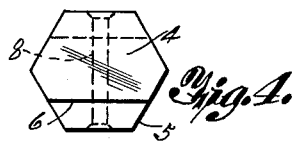
Figure 4 is a head end view of the form of connecter of the previous figures.
Figure 5:
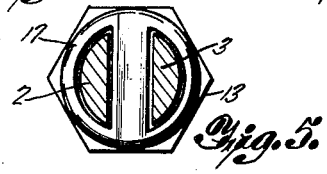
Figure 5 is a section on the line 5—5 of Figure 2.

There are shown and described in this specification three species of what may be termed unitary pivot leg connecters, the object being in each case to provide a structure in which, when the nut and press element assembly or the equivalent thereof, is withdrawn to the end of the leg upon which they are freely mounted, the pivot leg is then freed for relative movement for the admission or removal of wires.

As shown in Figures 1 to 5, the invention comprises a keeper or keeper lug or element represented generally at 1, the same including a pair of regularly formed and somewhat elongated legs 2 and 3 having the laterally expanded head portions 4 and 5 the inner contiguous faces of which are squared for forming a perfect pivot joint as represented or indicated at 6. A pivot pin hole 7 is formed transversely thru these aligned head portions and a pivot pin 8 is passed therethru, their outer ends being then upset as shown at 9. Thus the legs are securely yet pivotally locked together. At least one of the head portions, as 4, is extended or expanded inwardly as shown at 4n, thereby off-setting the legs from each other and providing therein between the space 10 for receiving the wires 11. Instead of the lateral head expansion being all incorporated on the one leg, the said expansions might be made equal on each leg, as will be readily understood, but it is thought that the arrangement as shown is the strongest. The outer sides of the legs 2 and 3 are complementally rounded and segmentally screw threaded as represented at 12, and thus adapted for engaging a tapped nut 13. This nut is formed with an interior groove or race 14 circumferentially cutting the threads thereof. The nut is also here shown with an annular boss 15 formed around its inner face. A cupped washer or bearing element 16 is rotatably mounted over this boss, having slidable contact with the nut, the said bearing element or washer including an outer ring portion 17 and a diametral rib 18 adapted to slidably pass within the wire receiving space 10 of the connecter, while the ring portion 17 encircles the legs thereof at their outer sides. A looped brace 19 is mounted within the orifice of the nut, the bight thereof being secured to the rib 18 in any suitable manner, as by striking ears 20 from the rib and pinching them down over the bight. The extremities 21 of the brace 19 are turned outwardly in opposed relation and freely disposed within the said race 14, thereby rotatably anchoring the elements 13 and 16 together. For the purpose of operatively anchoring these associated elements to the keeper, one of the legs thereof, as the leg 2, is lengthened and stripped of threads at this extremity as shown at 22, and a stud or stop element 23 is then extended inwardly at the inner face of that stripped and extended end and adapted to impinge one of the ears 20 of the rib 18 as the nut is withdrawn to the said end 22. By simply lengthening this stud 23 it would also impinge the bight of the brace 19, if so desired. The relative length of the legs and other structural details are such that when the nut and washer assembly is withdrawn to the end of the longer leg, the extremity of the shorter leg 3 will then just clear the inner face of the said washer, or bearing element, and so that that leg may be swung aside for admitting the wires 11 into the space 10. That being done, the shorter leg is then swung back into alignment with the longer leg and the nut and washer assembly is turned up over the two and against the wires for locking them into their seat at the closed end of the device. Of course the described operation would be reversed for the removal of the wires. From the foregoing it is thought that the construction as well as the method of use and operation of this form of the connecter will be fully understood.

Figure 6:
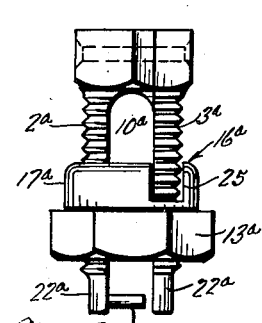
Figure 6 is a side elevation of a modified form of the connecter, the legs being shown as closed in alignment and the nut and bearing element being partially advanced over the legs, as in the process of locking wires within the connecter.
Figure 7:
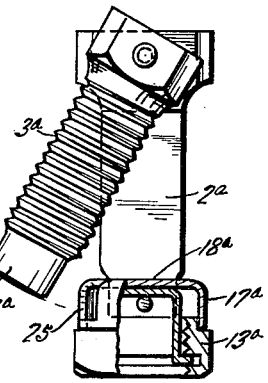
Figure 7 is a side elevation of the form of connecter shown in Figure 6, taken at ninety degrees thereto, the nut and bearing element assembly being fully withdrawn, and shown partly in section, and the free pivot leg being shown as swung aside as for the admission of wires into the connecter.

In the modification shown in Figures 6 and 7, the structural details and method of operation are substantially the same as for the form of the invention shown in Figures 1 to 5. Except that in this modification the legs 2a and 3a are of equal length and are both stripped at their ends as shown at 22a. Therefore and in order to afford the pivot leg 3a the necessary clearance above the inner face of the nut 13a and at the same time provide an efficient bearing element or washer for pressing the wires to their seat, the ring portion 17a is considerably widened, as clearly shown in Figure 6 and a notch 25 is formed thru the skirt thereof in exact alignment with the plane of movement of the free leg 3a. By this arrangement, when the nut and washer assembly is withdrawn to the end of the leg 2a, the extremity of the free or pivot leg 3a may be readily swung out thru the notch 25 for opening a way into the space 10a for the admission of the wires.

Figure 8:
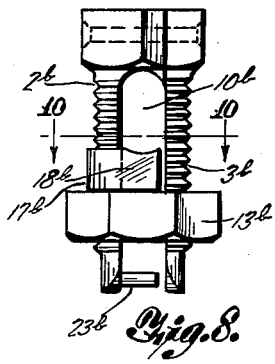
Figure 8 is a side elevation of another modified form of the connecter, the variation here shown relating more especially to the assembly of nut and bearing element.
Figure 9:
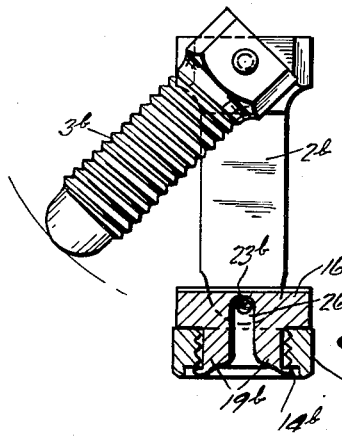
Figure 9 is a side elevation of the form of connecter shown in Figure 8, taken at ninety degrees thereto, the nut and bearing element assembly being shown as withdrawn and in section, and the free pivot leg being shown swung aside.
Figure 10:
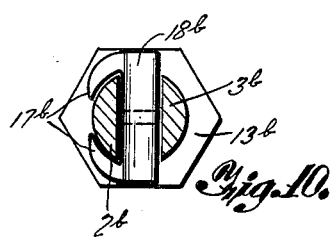
Figure 10 is a section on the line 10—10 of Figure 8.

In the additional modification shown in Figures 8 to 10, the legs 2b and 3b are of equal length, but in lieu of the notched washer or bearing element 16a of the form last described, here the bearing element consists of a single diametral rib 18b substantially filling the space 10b and having the ears 17b extended from its ends partially around the leg 2b, which they slidably embrace for holding these two elements in operative alignment. This rib 18b is further provided with anchor lugs 19b which are extended from opposite portions of the inner face of the rib thru the orifice of the nut 13b and then spread laterally into the circumferential groove 14b formed around the outer margin of the orifice of the nut, whereby these elements are rotatably locked together. The rib 18b is additionally notched medially at its inner side between the lugs 19b, as shown at 26, which notch engages the stop pin 23b extended inwardly from the extremity of the leg 2b, when the nut and bearing element are withdrawn for the admission of wires into the space 10b. This arrangement permits the nut and bearing element to be drawn out far enough so that the free leg 3b may be swung clear for admitting wires into the space 10b.

It is thought that from the foregoing descriptions the use and methods of operation of the several forms of the invention here shown will be fully understood, and while 1 have here described and shown various structural details for making and assembling said connecters, it is understood that I am not to be confined strictly thereto, but may make any desired changes therein which are in the nature of equivalents,

I claim:

1. A wire connecter comprising two elongated legs spaced apart and pivotally connected at one end to move in parallel planes, one of the legs being longer than the other and the extremity thereof being stripped of threads but the remaining portions of the outer faces of the legs being complementally rounded and screw threaded to engage a tapped nut, a bearing element and nut rotatably connected together and slidably and threadedly mounted upon the longer of the two legs, the same being adapted also to similarly engage the shorter leg when the two are properly aligned for the purpose, and a stop element at the stripped extremity of the longer leg for engaging the said press element on its withdrawal movement, the relative length of the legs being such that the shorter leg may then be swung aside for admitting wires into the space between the legs.

2. A wire connecter comprising two elongated legs spaced apart and pivotally connected at one end to move in parallel planes, except for their extremities the outer sides of the legs being complementally rounded and screw threaded to resemble a bolt like structure when the legs are aligned, with a wire receiving space therein between, a stop element extended at the extremity of one of the legs towards the opposite leg, a nut adapted to threadedly engage the aligned legs the nut having an interior race circumferentially cutting the threads thereof, and a bearing element rotatably mounted at the predetermined advancing face of the nut, the same including a washer ring adapted to freely embrace the aligned legs of the assembly and a diametral rib for freely extending thru between them and a looped brace within the orifice of the nut and connected at its bight with the diametral rib of the bearing element the extremities of the brace being turned outwardly into the said race of the nut as means for operatively anchoring these elements together, the said stop element of the one leg being adapted to engage the said associated brace and rib of the bearing element for operatively anchoring the same together with the connected nut to that leg, the ring of the bearing element being cut away in the plane of movement of the free end of the other leg for allowing that end to be swung freely aside thru said cut away portion of the ring, for admitting wires into the space between the legs of the connecter.

3. In a device of the kind described, an elongated keeper comprising two legs movably joined to move athwart one another in parallel planes for admitting wires therein between, the legs being spaced apart at transversely adjacent portions for providing the necessary wire receiving space, the outer sides of the legs being complementally rounded and segmentally screw threaded to engage a tapped nut, a tapped nut for engaging the said legs, and means operatively anchoring the nut to one of the legs so that the nut may be withdrawn to the end thereof for freeing the other leg for relative lateral movement for admitting the wires.

4. A wire connecter comprising two somewhat elongated legs pivotally connected at one end to move over one another in parallel planes for admitting and removing wires, the outer sides thereof being complementally rounded and screw threaded adjacent their connected ends for engaging a tapped nut when aligned for that purpose, the legs being formed at their inner sides to provide a wire receiving space therein between when the legs are aligned for the reception of a nut, a tapped nut for engaging the aligned legs for locking them together and closing the intervening wire receiving space, and means for operatively anchoring the nut to one of the legs so that when withdrawn to the end thereof the opposite free leg may be moved away from the nut for the admission or removal of wires into or from the wire receiving space between the legs.

5. A wire connecter comprising two elongated legs connected at one end by a pivot joint whereby the legs may move athwart each other in parallel planes, the outer sides of the legs being complementally rounded and screw threaded for engaging a tapped nut when the legs are in alignment for that purpose, there being a wire receiving space provided between the legs when so aligned, a tapped nut for engaging the aligned legs, and means for operatively anchoring the nut to one of the legs so that when the nut is withdrawn to the end thereof the free end of the other leg may be swung clear for the admission or removal of wires into or from the said wire receiving space.

6. A wire connecter comprising two elongated legs freely connected adjacent one end so as to move apart or together at the other end in parallel planes for receiving or releasing wires, their outer sides being complementally rounded and screw threaded for a space adjacent their connected ends for engaging a tapped nut when the legs are oppositely aligned for the purpose, there being a wire receiving space provided between the legs as so aligned, a bearing element slidably associated with the legs the same being loosely anchored upon one of the legs and withdrawable to the end thereof for freeing the other leg for opening a way into the wire receiving space, and a nut rotatably anchored at the outer face of the bearing element and adapted to threadedly engage the said aligned legs of the connecter for locking the wires therein.

7. A wire connecter comprising two elongated legs pivotally pinned together at one end to swing athwart one another in parallel planes, there being a wire engaging space provided between the legs and the outer sides of the legs being rounded and screw threaded for engaging a tapped nut, a tapped nut for the legs, a bearing element rotatably anchored at the predetermined inner face of the nut and adapted to slidably engage the aligned legs of the connecter as the nut threadedly engages the same, and means for operatively anchoring the bearing element freely upon one of the legs so that it as well as the nut may be withdrawn to the end of that leg for admitting wires into the wire receiving space, the free end of the other leg being then released for opening a way for the wires.

8. A wire connecter comprising a bolt-like member including two legs movably connected adjacent one end for movement over one another in parallel planes, the inner faces of the legs being spaced apart save at their connected ends, the outer sides of the legs being complementally rounded and screw threaded for a space adjacent the connected ends for engaging a tapped nut when moved into alignment, a bearing element and a nut rotatably connected and freely and operatively anchored upon one of the legs, the same being adapted to engage both of the legs when aligned for the purpose, the means for anchoring the nut and bearing element upon the one leg comprising a stop element at the extremity of that leg arranged to contact with the bearing element on its withdrawal movement, the bearing element being cut away at one side to pass the extremity of the other free leg, for closing the legs together or opening them apart, in the operation of the device.

9. A wire connecter comprising two legs spaced apart and freely connected at one end to move over one another in parallel planes, the outer sides of the legs being complementally rounded and screw threaded for engaging a tapped nut, a stop element extended from the extremity of one of the legs inwardly towards the other leg, a nut adapted to threadedly engage the aligned legs, and a bearing element rotatably mounted at the predetermined inner face of the nut and dimensioned to fill the space between the two aligned legs, there being extensions of the bearing element at one side thereof passed thru the orifice of the nut at opposite sides of the orifice and spread at their extremities for operatively and rotatably locking the two together, the bearing element being recessed medially at its inner side between the said extensions to accommodate the stop element of the one leg on the withdrawal movement of the bearing element, so that the free end of the other leg may be then swung aside for admitting wires into the space between the legs.

JASPER BLACKBURN.